July 4, 1933.   R. M. GILSON   1,916,307
BATTERY CHARGING REGULATION
Filed Oct. 30, 1930

INVENTOR:
R. M. Gilson,
BY
His ATTORNEY

Patented July 4, 1933

1,916,307

UNITED STATES PATENT OFFICE

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

BATTERY CHARGING REGULATION

Application filed October 30, 1930. Serial No. 492,241.

My invention relates to battery charging regulation systems, and has for an object the provision of novel and improved means for regulating the charge delivered to a storage battery in accordance with the amount of current drawn from the battery by the load.

I will describe five forms of systems embodying my invention, and will then point out the novel features thereof in claims.

Figure 1:
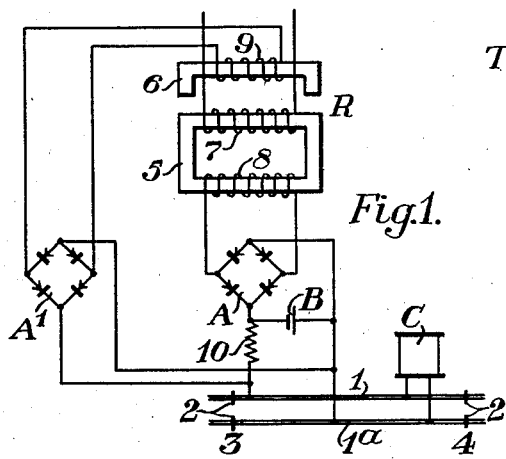

In the accompanying drawing, Fig. 1 is a diagrammatic view showing one form of battery charging regulation system embodying my invention. Figs. 2 to 5, inclusive, are views similar to Fig. 1, but showing modifications of portions of the apparatus shown in Fig. 1, and also embodying my invention.

Similar reference characters refer to similar parts in each of the several views.

Referring first to Fig. 1, the load, in the form here shown, is a railway signaling track circuit. The reference characters 1 and $1^a$ designate the track rails of a railway track, which rails are divided by insulated joints 2 to form a track section 3—4. Connected across the rails at one end of this section is a direct current track relay C, and a storage battery B is connected across the rails at the other end through a current-limiting resistance 10. The battery B is supplied with charging current from a source of alternating current through a full-wave rectifier A.

The reference character R designates a reactive transformer having a main core 5 provided with a primary 7 and a secondary 8. This transformer also has a leakage block 6 shunting the portion of the core 5 which carries the primary 7, and the leakage block is provided with an auxiliary secondary 9. The primary 7 is connected with a source of alternating current which is not shown in the drawing. The main secondary 8 is connected with the input terminals of the main rectifier A, and the output terminals of this rectifier are connected with the battery B. The auxiliary secondary 9 is connected with the input terminals of an auxiliary full-wave rectifier $A^1$, and the output terminals of the rectifier $A^1$ are connected across the rails 1 and $1^a$, that is, they are connected directly with the load.

When the track section 3—4 is unoccupied, and the track ballast is dry, the voltage applied to the track rails by the battery B is higher than the voltage delivered by rectifier $A^1$, this being accomplished by the proper design of the secondary 9 and the rectifier $A^1$. Under this condition, no direct current can flow from rectifier $A^1$, and so the secondary 9 is practically on open circuit. Transformer R then acts as a reactive transformer, so that the amount of charging current delivered to the battery B depends upon the particular adjustment of the air gap between the leakage block 6 and the main transformer core 5. These adjustments can be made such that the charging current delivered to the battery equals the normal load current plus the internal losses of the battery. As the load increases, due to occupancy of the track section 3—4 by a train, or to wet ballast, the voltage across the track rails at the battery end will drop, and so the current drawn from the battery will increase. As soon as the voltage across the rails becomes less than the output voltage of rectifier $A^1$, part of the track circuit load will be carried by the rectifier $A^1$. This will result in drawing current from the auxiliary secondary 9, and this current will force more of the flux generated by the primary 7 through the main secondary 8, thereby increasing the charging current delivered to battery B by rectifier A. It follows that the lower the resistance of the load, the greater will be the amount of direct current drawn from the rectifier $A^1$, and so the greater will be the charge delivered to the battery B. By proper proportioning of the parts of the apparatus, the charge delivered to the battery may be made equal to the load plus the internal battery losses under all conditions.

Figure 2:
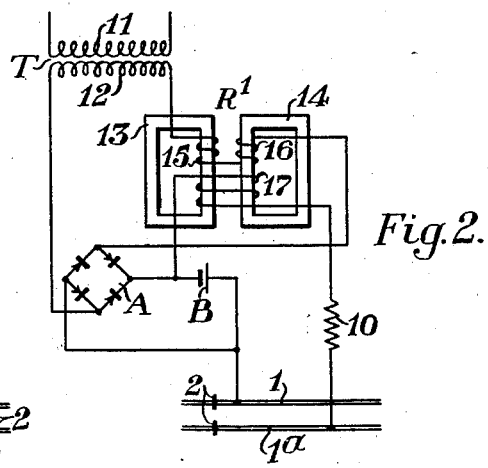

Referring now to Fig. 2, the apparatus in the form here shown, comprises a transformer T and a regulating reactor $R^1$. Reactor $R^1$ has two iron cores 13 and 14, with a primary 16 on core 14 and a primary 15 on core 13. The two cores are linked by a secondary coil 17. The primary 11 of the transformer T is constantly supplied with alternating current from a source not shown in the drawing. The secondary 12 of this transformer is connected with the input terminals of rectifier A through the two primary coils 15 and 16 of the reactor $R^1$. The output terminals of rectifier A are connected with the battery B. The battery B is connected with the load, that is, with the track rails 1 and $1^a$, through the secondary coil 17 of reactor $R^1$. The primary coils 15 and 16 are so connected that the fluxes created by the current flowing therein create opposing voltages in the secondary coil 17, and this prevents the flow of alternating current in the load circuit. As the load current drawn from the battery B increases, the increased current in secondary 17 decreases the reactance of coils 15 and 16, thereby increasing the alternating current supplied to the rectifier A, with the result that the charging rate of the battery is increased. In other words, the charge delivered to the battery varies in proportion to the load drawn from the battery.

Figure 3:
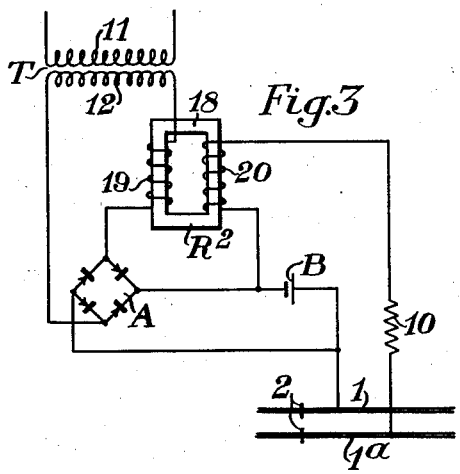

Referring now to Fig. 3, the apparatus shown in this view is the same as that shown in Fig. 2, except that the regulating reactor, which is here designated $R^2$, comprises only one core 18 provided with a primary coil 19 and a secondary coil 20. The primary coil 19 is connected in the input circuit of the rectifier A, while the secondary coil 20 is connected in series with the battery B and the load. As the load current increases, alternating current is drawn from the reactor coil 20, and this assists the saturation effect of the direct current through this coil in reducing the impedance of coil 19 to the alternating current supplied to rectifier A. The result of this is that the charging rate of the battery is increased when the load on the battery increases.

Figure 4:
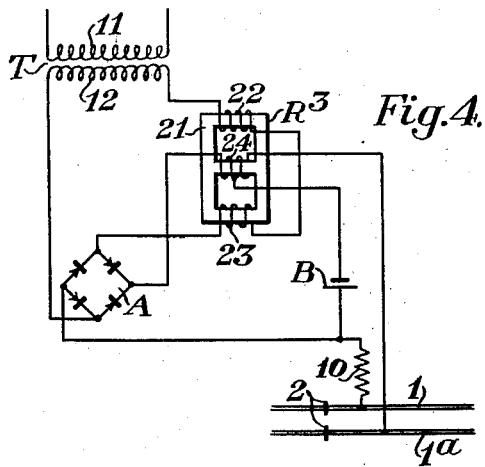

Referring now to Fig. 4, the reactor, which is here designated $R^3$, comprises a core 21 having three parallel legs. The outer legs are provided with primary coils 22 and 23, while the middle leg is provided with a secondary coil 24. The primary coils are included in the input circuit for the rectifier A. The secondary coil 24 is provided with a tap, and the right-hand portion of this coil is included in the output circuit for battery B, that is, this portion of the coil is interposed between the battery and the load. The left-hand portion of the coil 24 is included in series in the output circuit of rectifier A, so that this portion carries the battery charging current. It follows that both the load current drawn from the battery and the charging current supplied to the battery, assist in saturating the reactor core to reduce the impedance of the coils 22 and 23, and so to increase the charging current delivered to the battery in response to increase in the load drawn from the battery. The proper design of the coils and of the magnetic circuit of reactor $R^3$ will cause a certain charging rate into the battery when the voltage of the battery is normal under discharge. (Approximately 2.0 volts for a lead storage battery.) As this current charges the unloaded battery, the battery terminal voltage increases to about 2.2 or 2.3 volts for a lead battery. This increased battery voltage will tend to reduce the charging current and thereby the saturating effect of the charging current flowing through the left-hand part of coil 24. Due to this reduction in the direct current saturation, the alternating current impedance of coils 22 and 23 will be increased, and the charging rate will, therefore, be still further reduced. In other words, a balanced relation between charging current and state of battery charge will be obtained, and this will prevent the battery from being overcharged under the unloaded condition. It follows that the portion of coil 24 which is in the charging circuit, will not act cumulatively to increase the charging current to a higher value than desired when the battery is not furnishing current.

Figure 5:
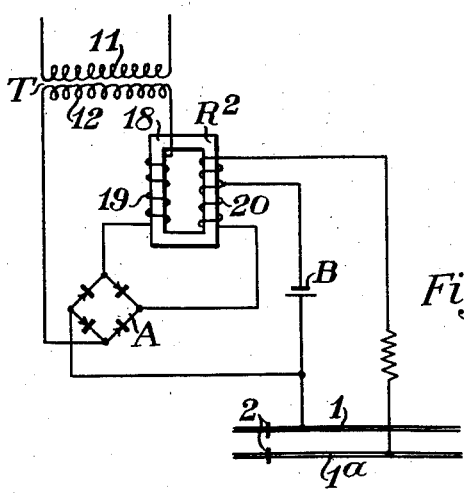

Referring now to Fig. 5, the apparatus is the same as that shown in Fig. 3, except that the reactor coil 20 is provided with a tap, and the upper portion of this coil is included in the load circuit while the lower portion is included in the circuit for the battery charging current. The effect of this divided coil is the same as in Fig. 4. In addition, alternating current drawn from the upper portion of coil 20 helps to increase the charging rate in response to increase in the load drawn from the battery. Furthermore, the apparatus shown in Fig. 5 provides for half-wave rectification of the alternating potential induced in coil 20 by the current in coil 19, and this half-wave rectified current assists the full-wave rectified current in charging the battery. The reason for this, is as follows: The portion of the secondary winding 20 of reactor $R^2$ which is in series with the battery B, has its circuit completed through the rectifier A. This circuit affords a half-wave charging circuit. Since alternating current potential is available at the terminals of the portion of winding 20 included in this circuit, it is obvious that a circuit is presented consisting of a source of alternating current, a battery, and an asymmetric unit, and this will result in furnishing half-wave uni-directional current to the battery when the instantaneous polarity of the alternating potential used is such as to force current through the rectifier in its low resistance direction. Superimposed on this half-wave current there will also be the full-wave current delivered by the rectifier A from the alternating current supplied by transformer T.

One feature of my invention in the forms illustrated in Figs. 2 to 5, inclusive, lies in the fact that the load current is taken through a regulating reactor the primary of which is in series with the alternating current supplied to the rectifier. This results in varying the charge delivered to the battery in proportion to the current drawn from the battery by the load. This arrangement of apparatus is especially desirable when the load is a railway track circuit, because of the wide variations in the current required by this load due to the presence and absence of trains and also due to variations in the resistance of the track ballast in response to changes in weather conditions.

Although I have herein shown and described only five forms of apparatus embodying my invention, it is understood that various changes and modifications may be made therein within the scope of the appended claims without departing from the spirit and scope of my invention.

Having thus described my invention, what I claim is:

1. In combination, a direct current load, a reactor having two iron cores with a primary coil on each core and a secondary coil enveloping both cores, a constant potential transformer, a storage battery connected with said load through said reactor secondary coil, and a rectifier having its input terminals connected with the secondary of said transformer through said two reactor primary coils, and its output terminals connected across said battery, said reactor primary coils being so connected that the fluxes created by the current flowing therein create opposing voltages in the reactor secondary coil.

2. In combination, a direct current load characterized by wide variations in resistance, a reactor having a primary and a secondary coil, a storage battery connected with said load through said secondary coil, a constant potential transformer, and a rectifier having its input terminals connected with the secondary of said transformer through the primary coil of said reactor and its output terminals connected with said battery, whereby the amount of charging current delivered to the battery varies in proportion to the amount of current drawn from the battery by the load.

3. In combination, a direct current load, a reactor having two primary coils and a secondary coil, a storage battery connected with said load through a portion of said reactor secondary coil, a constant potential transformer, and a rectifier having its input terminals connected with the secondary of said transformer through said two reactor primary coils and its output terminals connected with said battery through the remaining portion of said reactor secondary coil.

4. In combination, a direct current load, a reactor having a primary and a secondary coil, a constant potential transformer, a storage battery connected with said load through a portion of said secondary reactor coil, and a rectifier having its input terminals connected with the secondary of said transformer through said primary reactor coil and its output terminals connected with said battery through the remaining portion of the secondary coil of said reactor.

In testimony whereof I affix my signature.

ROBERT M. GILSON.